(12) United States Patent  
Seo et al.

(10) Patent No.: US 8,736,970 B2  
(45) Date of Patent: May 27, 2014

(54) OPTICAL SYSTEM OF ZOOM LENS WITH IMAGE STABILIZATION

(75) Inventors: Jin-seon Seo, Jinju-si (KR); Hwan-seon Lee, Seoul (KR); Arkhipova Lyudmila Nikolaevna, St. Petersburg (RU); Gal'pern Lyudmila Aleksandrovna, St. Petersburg (RU)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 12/900,937

(22) Filed: Oct. 8, 2010

(65) Prior Publication Data

US 2011/0122507 A1    May 26, 2011

(30) Foreign Application Priority Data

Nov. 20, 2009  (RU) .............................. 2009142842  
May 11, 2010  (KR) ........................ 10-2010-0044141

(51) Int. Cl.
  *G02B 15/14*    (2006.01)
  *G02B 15/173*    (2006.01)
(52) U.S. Cl.
  CPC ................................... *G02B 15/173* (2013.01)
  USPC ........................................................ 359/687
(58) Field of Classification Search
  USPC ........................................................ 359/687
  See application file for complete search history.

(56) References Cited

U.S. PATENT DOCUMENTS

| 7,489,450 | B2 * | 2/2009 | Matsumoto et al. | 359/687 |
| 2007/0058268 | A1 * | 3/2007 | Terada | 359/687 |
| 2011/0051256 | A1 * | 3/2011 | Inoue et al. | 359/683 |

FOREIGN PATENT DOCUMENTS

| EP | 2 056 152 | 5/2009 |
| JP | 2009-128606 | 6/2009 |

OTHER PUBLICATIONS

A. Grbic and G.V. Eleftheriades: "Overcoming the Diffraction Limit with a Planar Left-handed Transmission-line Lens", Physical Review Letters, Mar. 19, 2004.

* cited by examiner

*Primary Examiner* — William Choi  
(74) *Attorney, Agent, or Firm* — The Farrell Law Firm, P.C.

(57) ABSTRACT

An optical system of a zoom lens is provided. The optical system of the zoom lens includes thirteen lenses which are divided into four lens groups, wherein: the zoom lens comprises in a following order from a subject: a first lens group which has a positive refractive index; a second lens group which has a negative refractive index, and moves along an optical axis; a third lens group which has a positive refractive index; and a fourth lens group which has a positive refractive index, wherein the first lens group comprises four lenses, and an external surface of a first lens is concave in a direction of a plane of an image; the third lens group comprises two meniscus lenses which are concave toward an image plane, and is made with capability of cross-section displacement relative to an optical axis; and the fourth lens group is convex-concave glued lens.

12 Claims, 11 Drawing Sheets

FIG. 1
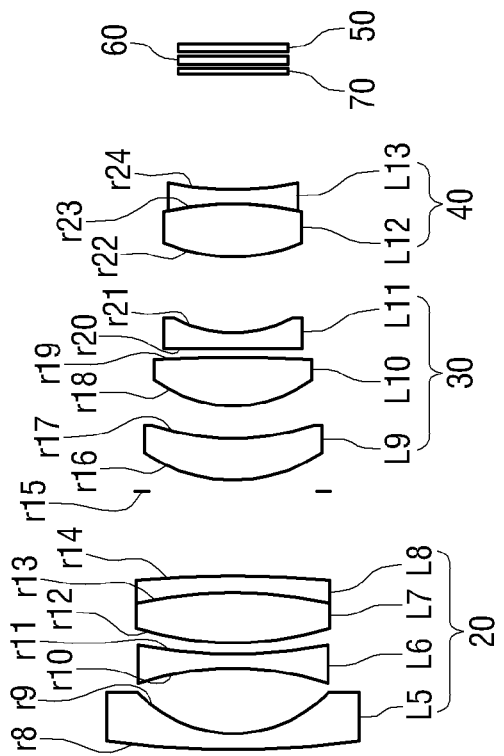
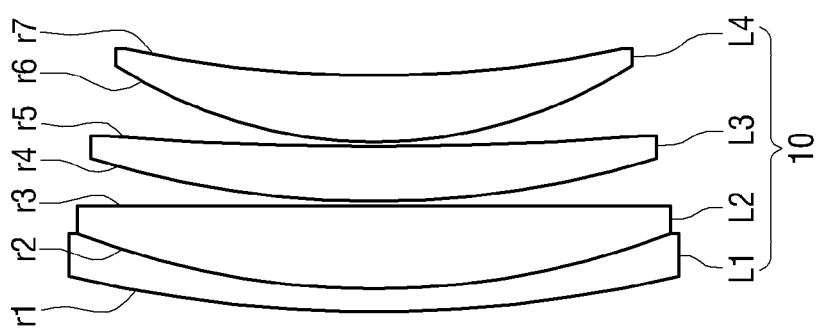

FIG. 11
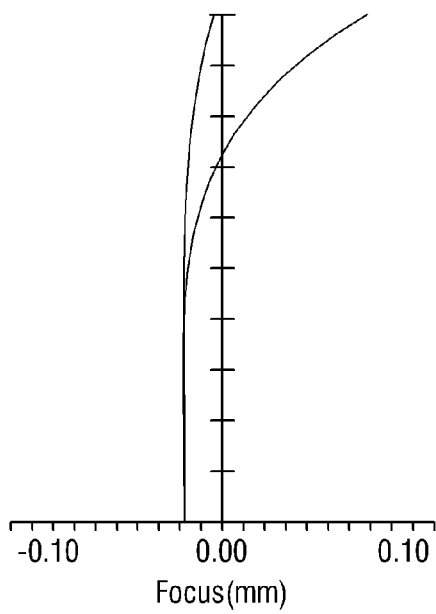
Astigmatism Aberration
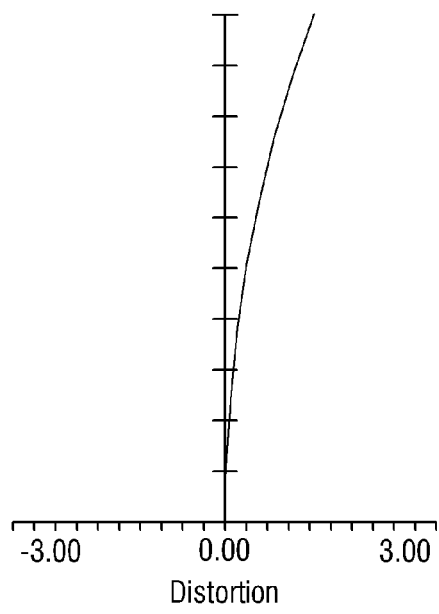
Distortion Aberration

OPTICAL SYSTEM OF ZOOM LENS WITH IMAGE STABILIZATION

PRIORITY

This application claims priority under 35 U.S.C. §119(a) to Russian Patent Application No. RU2009142842 filed on Nov. 20, 2009, and Korean Patent Application No. 10-2010-44141 filed on May 11, 2010, the disclosures of which are incorporated herein by reference.

BACKGROUND

1. Field of the Invention

The present invention relates generally to the structure of an optical device, and more particularly, to the structure of a high-performance zoom lens providing high magnification, which is used for other photographing apparatuses, in particular, a video camera, and which provides image stabilization when the lens shakes.

2. Description of the Related Art

A zoom lens is a mechanical assembly of lens elements with the ability to vary its focal length continuously, thereby enlarging or reducing the size of a captured image. To achieve high magnification and reduce aberration occurring on a zoom lens, the zoom lens operates in combination with a plurality of other lenses. Therefore, the zoom lens is larger and heavier than a prime lens with a single focal length.

Photographing apparatuses having a zoom lenses, such as digital still cameras and video cameras, have been widely used. There has been a great deal of effort to make these photographing apparatuses compact and light for greater user convenience.

However, a zoom lens requires a plurality of lenses in order to achieve high zoom magnification and reduce aberration that occurs on a zoom lens. The plurality of lenses makes it difficult to fabricate a zoom lens with a compact and light optical system. For example, if the number of lenses is reduced to make a zoom lens with a smaller and lighter optical system, longitudinal chromatic aberration or lateral chromatic aberration may be significantly increased.

In addition, the zoom lens system is not equipped to handle movement problems resulting from, for example, vibrations of a user's hand.

SUMMARY

The present invention has been made to address at least the above problems and/or disadvantages and other disadvantages not described above, and to provide at least the advantages described below. However, the present invention is not required to overcome the disadvantages described above.

An aspect of the present invention provides an optical system which corrects monochromatic and chromatic aberration, in which values $T_{(N=160)}>0.2$ can be reached at an angle of stabilization$\pm 0.2°$ in a high zoom lens having a range (10-20×) and a length substantially equal to a maximal focal length.

According to one aspect of the present invention, an optical system of a zoom lens is provided having thirteen lenses that are divided into four lens groups. In an order from a subject, the zoom lens includes a first lens group having a positive refractive index, a second lens group having a negative refractive index and capable of moving along an optical axis, a third lens group having a positive refractive index, and a fourth lens group having a positive refractive index. The first lens group includes four lenses, and an external surface of a first lens is concave in a direction of a plane of an image. The third lens group includes two meniscus lenses that are concave toward an image plane, and is capable of cross-section displacement relative to an optical axis. The fourth lens group is a convex-concave glued lens.

According to another aspect of the present invention, an optical system of a zoom lens is provided. The zoom lens includes a first lens group having a positive refractive index, a second lens group disposed behind the first lens group and having a negative refractive index, a third lens group disposed behind the second lens group and having a positive refractive index, and a fourth lens group disposed behind the third lens group and having a positive refractive index. The third lens group includes two meniscus lenses and one convex lens disposed between the two meniscuses lenses.

According to an additional aspect of the present invention, a photographing apparatus is provided that includes an optical system of a zoom lens having thirteen lenses that are divided into four lens groups. In an order from a subject, the zoom lens includes a first lens group having a positive refractive index, a second lens group having a negative refractive index and capable of moving along an optical axis, a third lens group having a positive refractive index, and a fourth lens group having a positive refractive index. The first lens group has four lenses, and an external surface of a first lens is concave in a direction of a plane of an image. The third lens group has two meniscus lenses that are concave toward an image plane, and is capable of cross-section displacement relative to an optical axis. The fourth lens group is a convex-concave glued lens.

BRIEF DESCRIPTION OF THE DRAWINGS

The above and/or other aspects, features and advantages of the present invention will be more apparent from the following detailed description when taken in conjunction with the accompanying drawings, in which:

FIG. 1 is a diagram illustrating a sectional view of a zoom lens, according to an embodiment of the present invention;

FIG. 11 is a graph showing astigmatism aberration and distortion aberration at the telephoto end, according to an embodiment of the present invention.

DETAILED DESCRIPTION OF EMBODIMENTS OF THE PRESENT INVENTION

Figure 2:
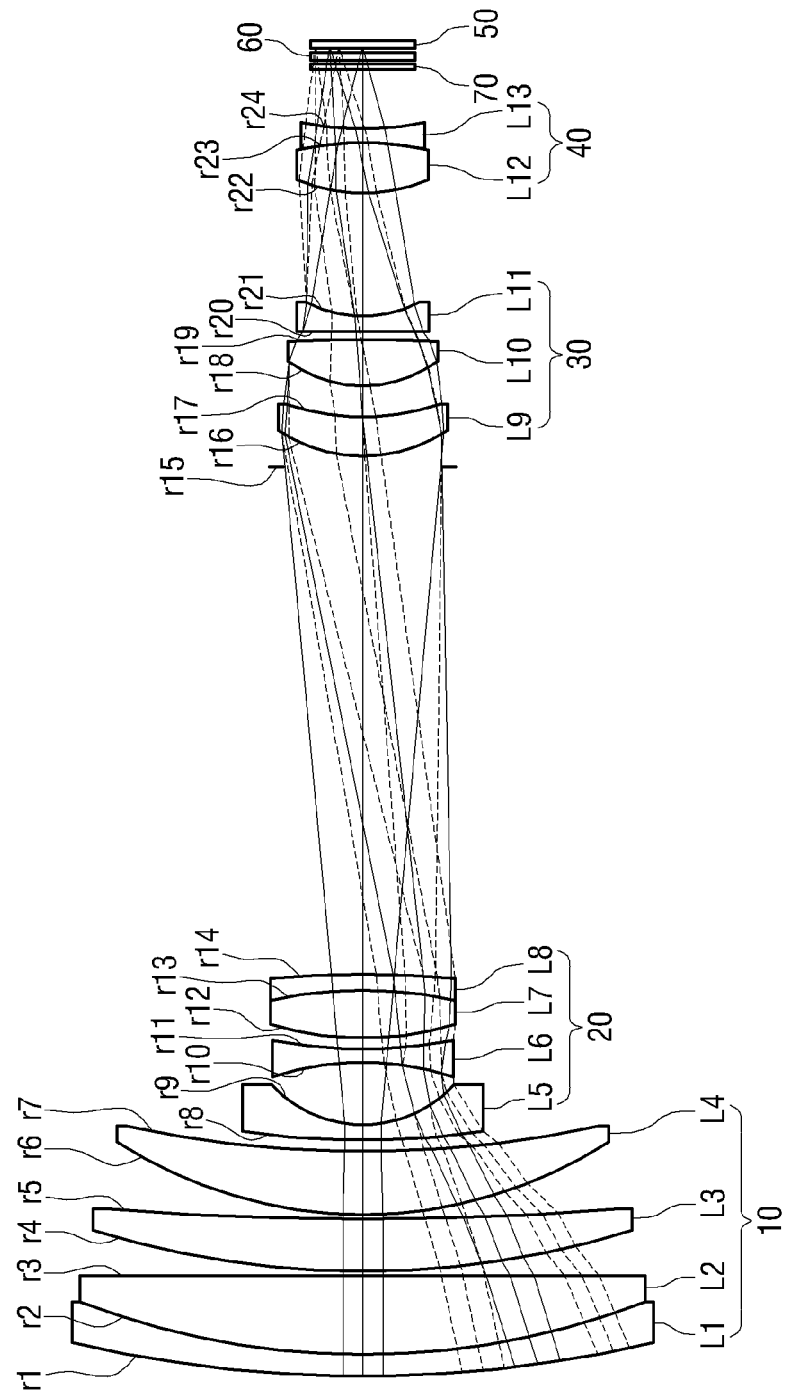
FIG. 2 is a diagram illustrating a sectional view of a zoom lens viewed from a wide angle end, according to an embodiment of the present invention.

Embodiments of the present invention are described in detail with reference to the accompanying drawings.

In the following description, the same or similar drawing reference numerals may be used for the same or similar elements although they are illustrated in different drawings. Matters defined in the description, such as detailed construction and elements, are provided to assist in a comprehensive understanding of the invention. Thus, it is apparent that embodiments of the present invention can be carried out without those specifically defined matters. Also, detailed descriptions of constructions or processes known in the art may be omitted to avoid obscuring the subject matter of the present invention.

FIG. 1 is a diagram illustrating a sectional view of a zoom lens, according to an embodiment of the present invention. In FIG. 1, Li represents lenses and ri represents radius of curvature.

A zoom lens includes a first lens group 10, a second lens group 20, a third lens group 30, a fourth lens group 40, an image forming surface 50, an optical filter 60, a cover glass 70, and an aperture r15. The plurality of lens groups 10, 20, 30, 40 are used in combination, and thus the zoom lens spans focal lengths ranging from wide angle to telephoto.

In FIG. 1, a subject is placed left of the first lens group 10, and the image forming surface 50, on which an image of the subject is formed, is disposed to the right of the fourth lens group 40. Specifically, the lenses are disposed in the following order from the subject: the first lens group 10, the second lens group 20, the third lens group 30, and the fourth lens group 40. Hereinafter, "subject direction" represents a direction towards the subject (the left direction in FIG. 1), and "image direction" represents a direction towards the image forming surface 50.

In an embodiment of the present invention, the first lens group 10 has a positive refractive index, and includes a first lens L1, a second lens L2, a third lens L3, and a fourth lens L4. The first and the second lenses L1, L2 may be composed of a cemented lens. The first lens L1 has surfaces with a radius of curvature r1 in the subject direction and a radius of curvature r2 in the image direction. The second lens L2 has surfaces with a radius of curvature r2 in the subject direction and a radius of curvature r3 in the image direction. The third lens L3 has surfaces with a radius of curvature r4 in the subject direction and a radius of curvature r5 in the image direction. The fourth lens L4 has surfaces with a radius of curvature r6 in the subject direction and a radius of curvature r7 in the image direction. The first lens group 10, which includes four lenses L1, L2, L3, L4 as shown in FIG. 1, is effective in compensating astigmatism aberration and distortion aberration. The first lens group 10 is fixed.

The second lens group 20 is disposed behind the first lens group 10, and has a negative refractive index. The second lens group 20 includes a fifth lens L5, a sixth lens L6, a seventh lens L7, and an eighth lens L8. The fifth lens L5 has surfaces with a radius of curvature r8 in the subject direction and a radius of curvature r9 in the image direction. The sixth lens L6 has surfaces with a radius of curvature r10 in the subject direction and a radius of curvature r11 in the image direction. The seventh lens L7 has surfaces with a radius of curvature r12 in the subject direction and a radius of curvature r13 in the image direction. The eighth lens L8 has surfaces with a radius of curvature r13 in the subject direction and a radius of curvature r14 in the image direction. Since the second lens group 20 uses a lens that is made of high refractive index material, the overall length of the camera may be reduced. Therefore, the size of a camera or a camcorder employing the zoom lens may be reduced. The second lens group 20 may be moved linearly along an optical axis by an actuator.

The third lens group 30 is disposed behind the second lens group 20, and has a positive refractive index. The third lens group 30 includes a ninth lens L9, a tenth lens L10, and an eleventh lens L11. The ninth lens L9 has surfaces with a radius of curvature r16 in the subject direction and a radius of curvature r17 in the image direction. The tenth lens L10 has surfaces with a radius of curvature r18 in the subject direction and a radius of curvature r19 in the image direction. The eleventh lens L11 has surfaces with a radius of curvature r20 in the subject direction and a radius of curvature r21 in the image direction. In an embodiment of the present invention, the third lens group 30 the ninth lens L9 and the eleventh lens L11 are meniscus lenses and the tenth lens is a convex lens. Since the third lens group 30 includes an aspheric lens, the third lens group 30 is effective in removing spherical aberration and preventing hand tremors. The third lens group 30 is fixed. The magnification of the third lens group 30 may range from approximately −0.58 to approximately −0.45. The third lens group 30 includes two meniscus lenses in the embodiment of FIG. 1, but the third lens group 30 may be implemented using three or more meniscus lenses.

The third lens group 30 of FIG. 1 further includes the aperture r15, which is formed on a side of the ninth lens L9 in the direction towards the subject and having a positive refractive index. The aperture r15 may be a fixed aperture since the fixed aperture does not require additional mechanical components to operate, thereby simplifying the structure of the optical system of the zoom lens.

The fourth lens group 40 is disposed behind the third lens group 30, and has a positive refractive index. The fourth lens group 40 includes a twelfth lens L12 and a thirteenth lens L13. The twelfth and the thirteenth lenses L12, L13 may be composed of a cemented lens. The twelfth lens L12 has surfaces with a radius of curvature r22 in the subject direction and a radius of curvature r23 in the image direction. The thirteenth lens L13 has surfaces with a radius of curvature r23 in the subject direction and a radius of curvature r24 in the image direction. The fourth lens group 40 is effective in compensating chromatic aberration. The fourth lens group 40 may be moved by auto focusing.

The optical filter 60 and the cover glass 70 are disposed between the fourth lens group 40 and the image forming surface 50, and thus filters light beams having an undesirable wavelength range.

The zoom lens illustrated in FIG. 1 uses two aspheric lenses. The first aspheric lens may be a surface having radius of curvature r18 of the tenth lens L10 of the third lens group 30, facing the subject. The second aspheric lens may be a surface having radius of curvature r21 of the eleventh lens L11 of the third lens group 30, facing the image. As described above, these aspheric lenses enable effective removal of spherical aberration and prevention of hand tremors.

TABLE 1

|  | r18 | r21 |
|---|---|---|
| Curvature | 0.1299976 = 1/r | 0.1134478 = 1/r |
| k | 0.5611781 | 4.042887e−5 |

TABLE 1-continued

| | r18 | r21 |
|---|---|---|
| a | 0 | 0 |
| b | 9.1680091e−5 | 5.3525709e−4 |
| c | 3.6300519e−7 | 7.7200082e−6 |
| d | 1.8933452e−8 | 6.0747594e−8 |
| e | 2.2026398e−9 | 1.1527088e−8 |
| f | | 1.1796855e−9 |

The main parameters of an aspheric lens according to an embodiment of the present invention are listed in Table 1, and calculated by Equation (1) as follows:

$$X = \frac{\frac{h^2}{r}}{1 + \left[1 - (1+k)\frac{h^2}{r^2}\right]^{1/2}} + bh^4 + ch^6 + dh^8 + eh^{10} + fh^{12} \quad (1)$$

where:
X represents a distance from a center of a lens toward an optical axis;
h represents a distance from the center of a lens perpendicular to the optical axis;
r represents a radius of curvature of a lens from a vertex of lens;
k represents the conic constant; and
b, c, d, e, f represent the aspheric coefficients.

Figure 3:
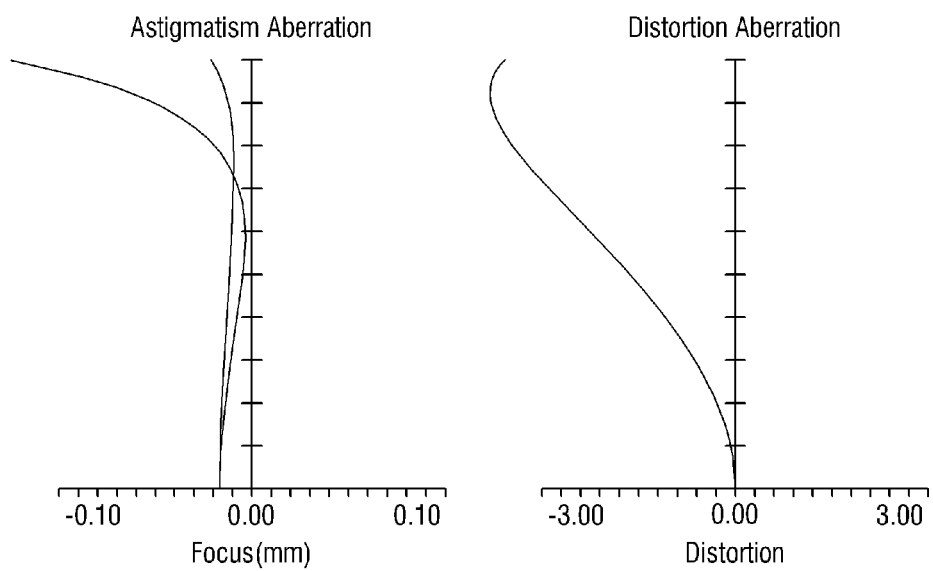
FIG. 3 is a graph showing astigmatism aberration and distortion aberration at the wide angle end, according to an embodiment of the present invention.
Figure 4:
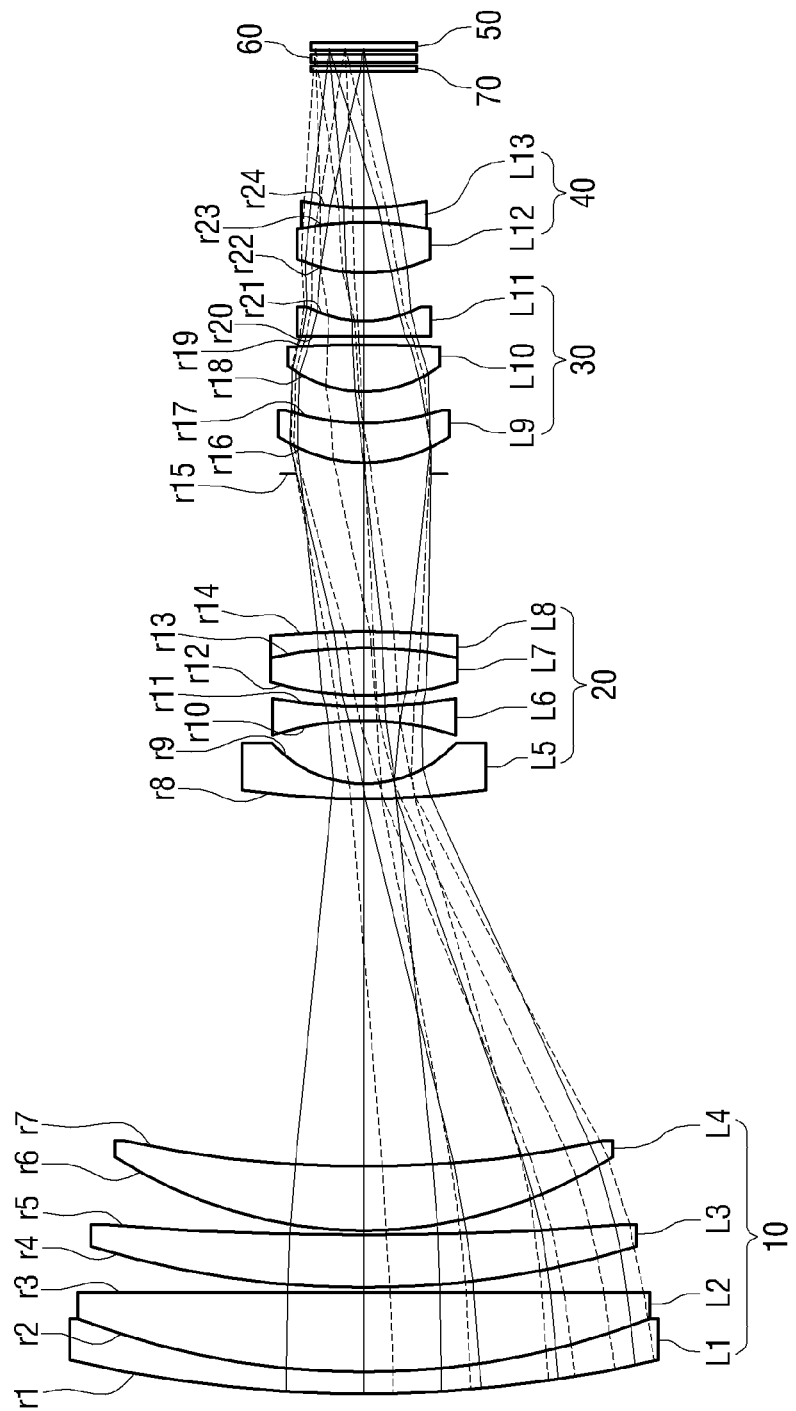
FIG. 4 is a diagram illustrating sectional view of a zoom lens viewed from the first middle position, according to an embodiment of the present invention.
Figure 5:
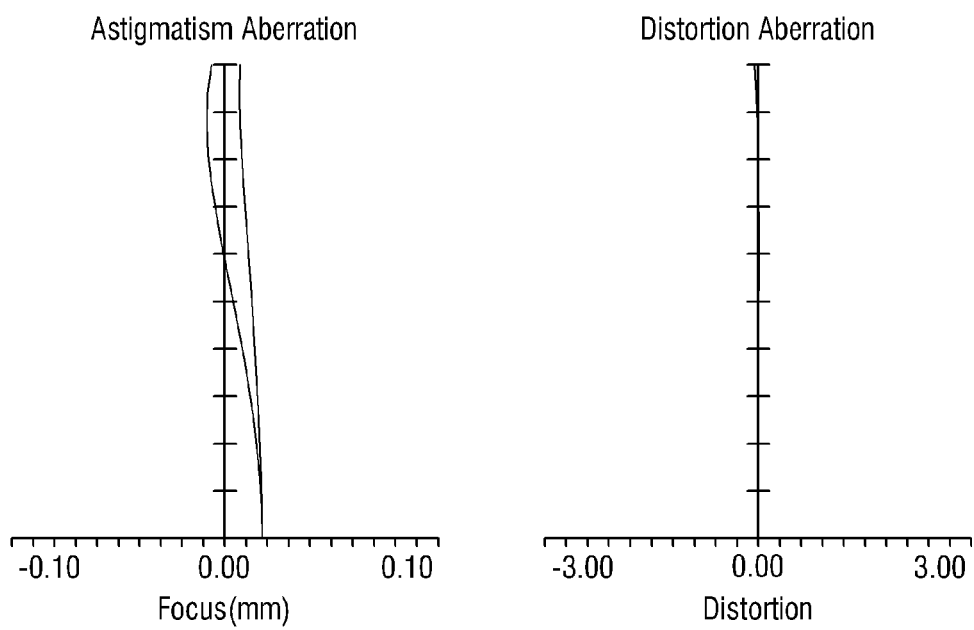
FIG. 5 is a graph showing astigmatism aberration and distortion aberration at the first middle position, according to an embodiment of the present invention.
Figure 6:
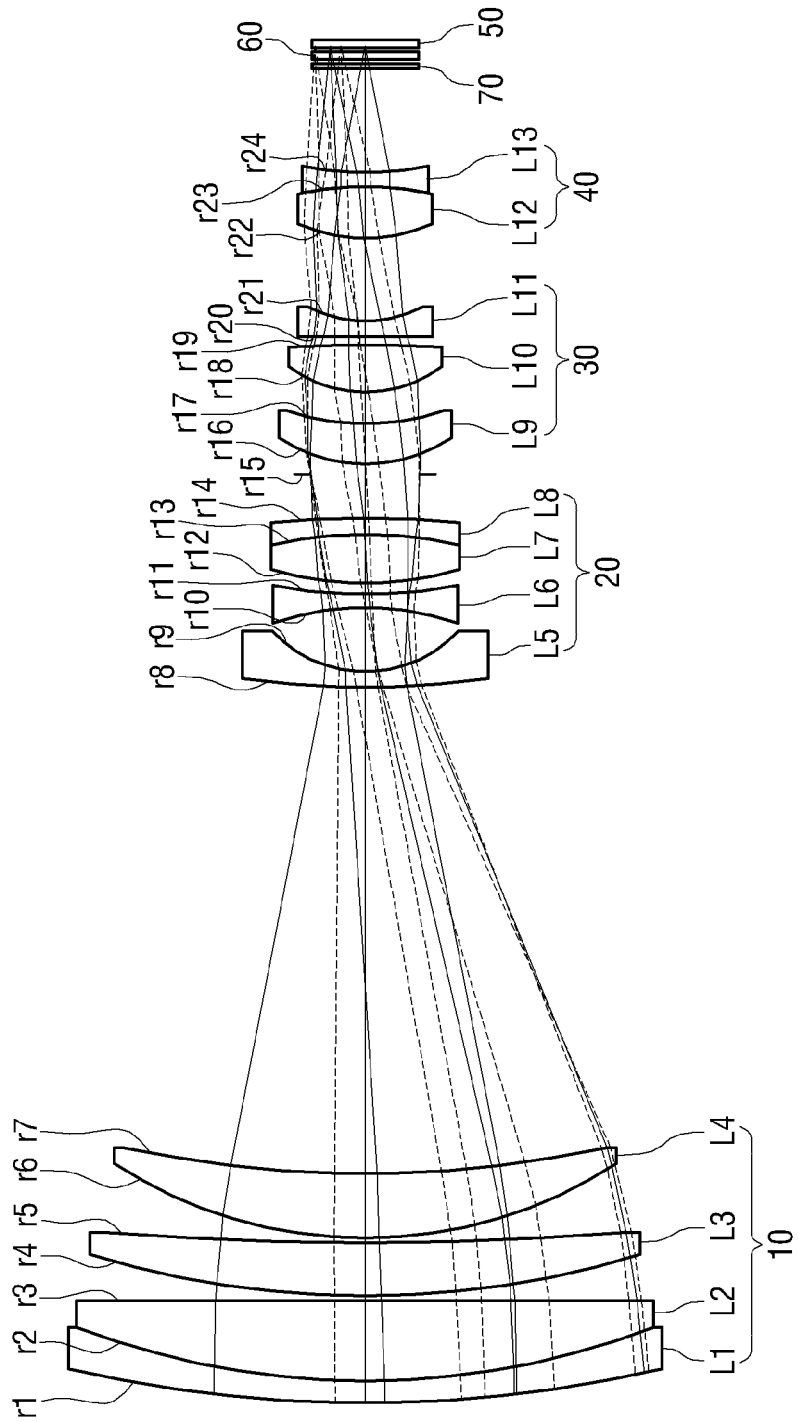
FIG. 6 is a diagram illustrating a sectional view of a zoom lens viewed from the second middle position, according to an embodiment of the present invention.
Figure 7:
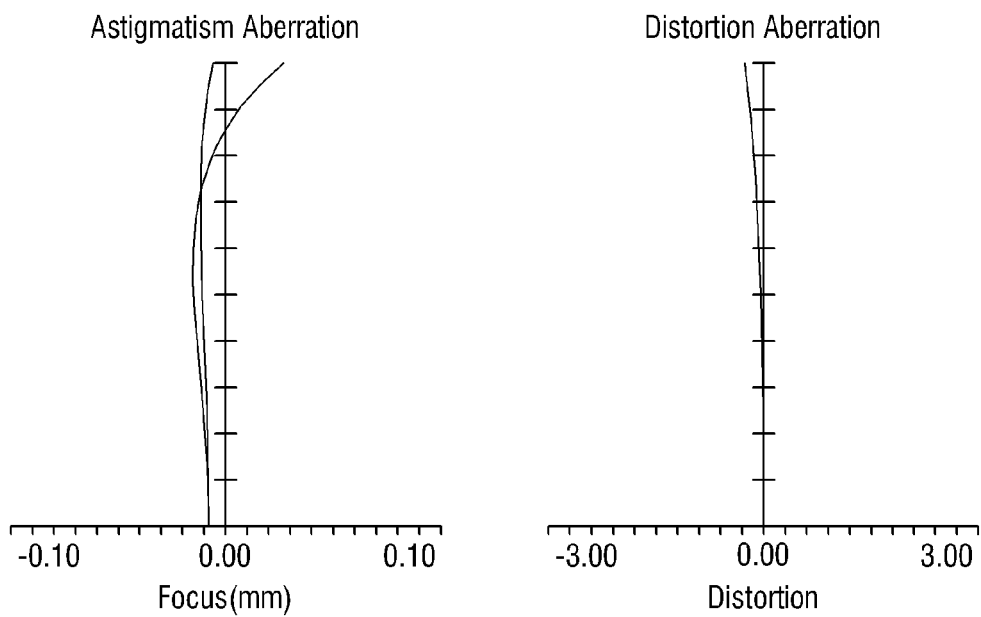
FIG. 7 is a graph showing astigmatism aberration and distortion aberration at the second middle position, according to an embodiment of the present invention.
Figure 8:
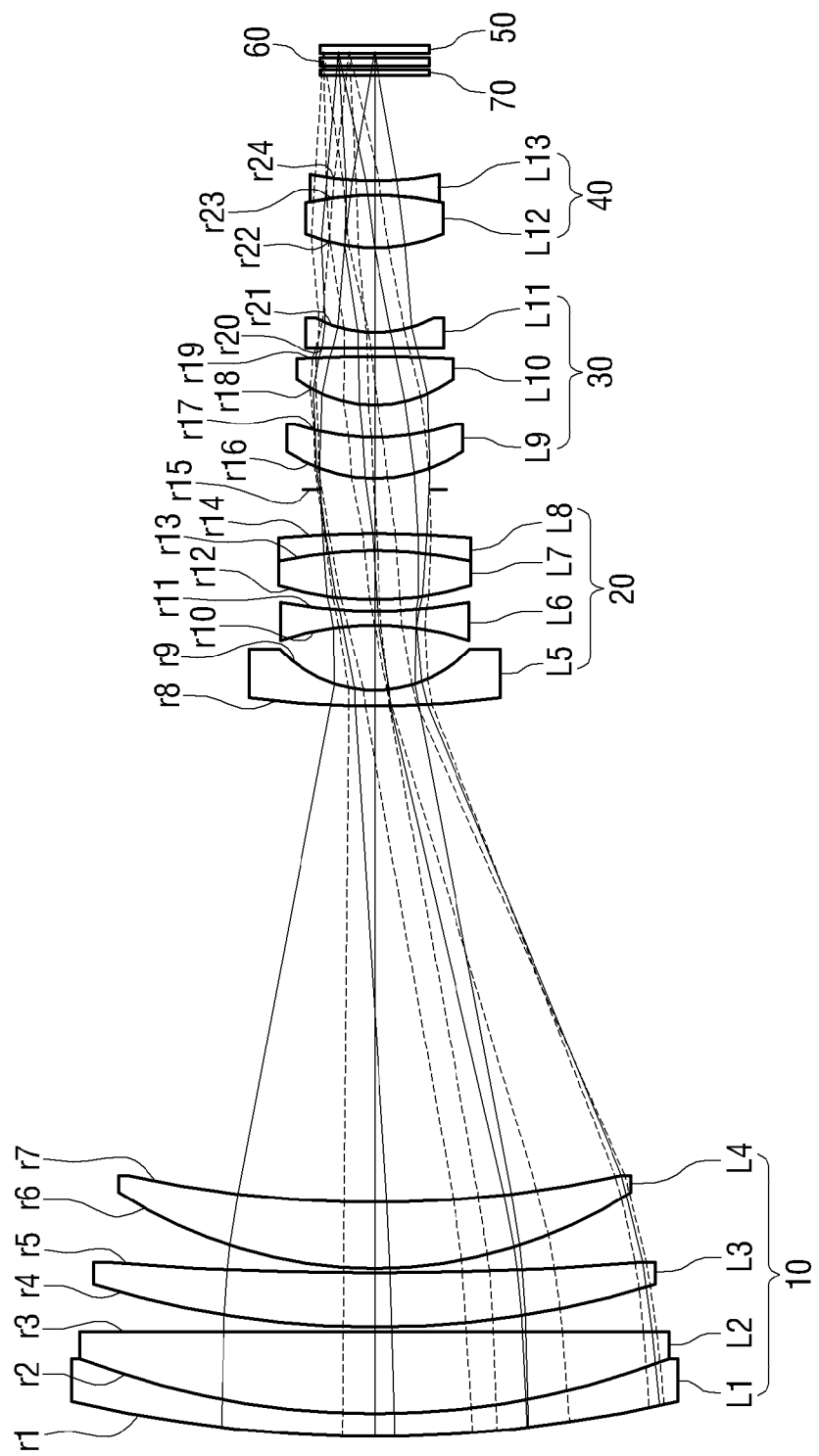
FIG. 8 is a diagram illustrating a sectional view of a zoom lens viewed from the third middle position, according to an embodiment of the present invention.
Figure 9:
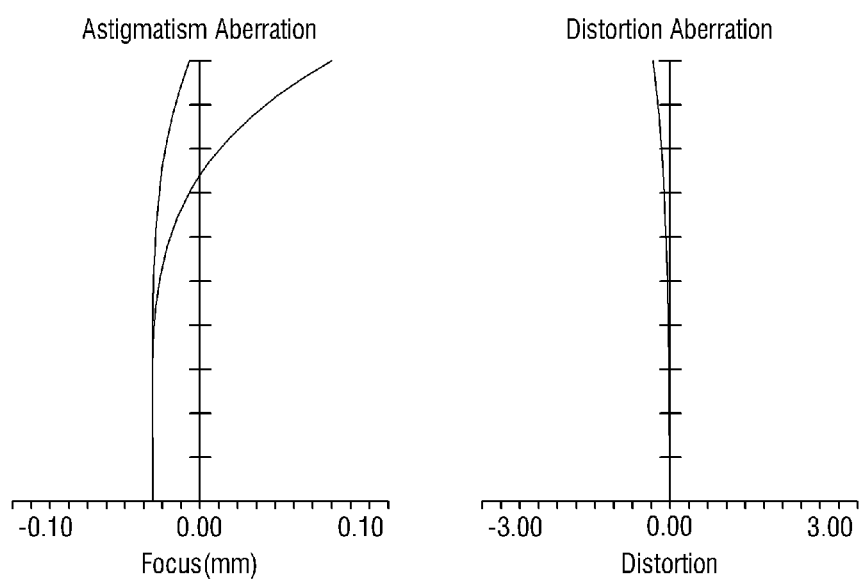
FIG. 9 is a graph showing astigmatism aberration and distortion aberration at the third middle position, according to an embodiment of the present invention.
Figure 10:
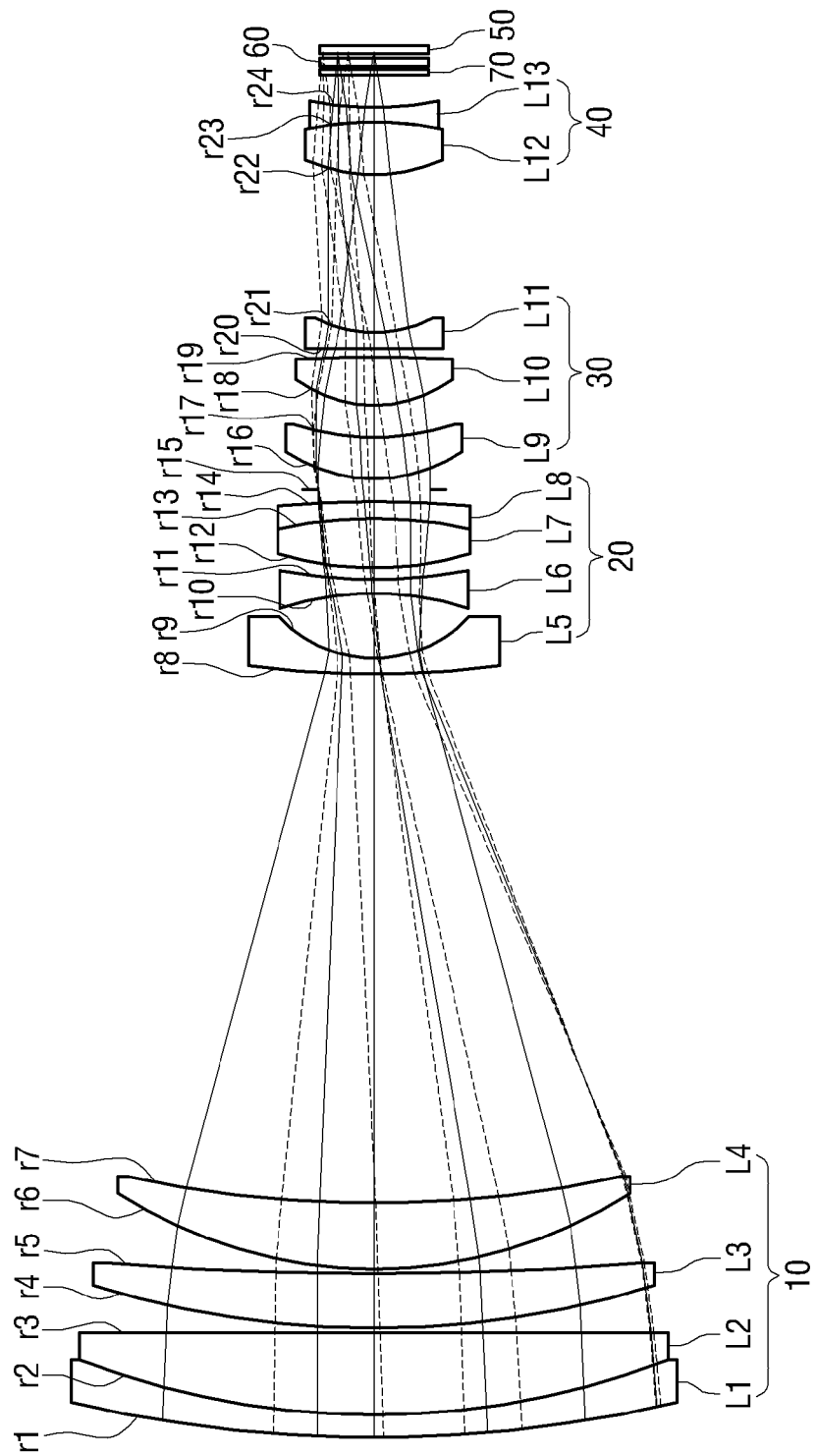
FIG. 10 is a diagram illustrating a sectional view of a zoom lens viewed from a telephoto end, according to an embodiment of the present invention.

The operation of a zoom lens is described in detail with reference to FIGS. 2 to 11. FIG. 2 is a diagram illustrating a sectional view of a zoom lens viewed from a wide-angle end, according to an embodiment of the present invention. FIG. 4 is a diagram illustrating a sectional view of a zoom lens viewed from the first middle position, according to an embodiment of the present invention. FIG. 6 is a diagram illustrating a sectional view of a zoom lens viewed from the second middle position, according to an embodiment of the present invention. FIG. 8 is a diagram illustrating a sectional view of a zoom lens viewed from the third middle position, according to an embodiment of the present invention. FIG. 10 is a diagram illustrating a sectional view of a zoom lens viewed from a telephoto end. The position of the lens group according to an embodiment of the present invention is listed Table 2 as follows:

TABLE 2

| δ | t | f | A | B | C | D |
|---|---|---|---|---|---|---|
| 0 | 0 | 5 | 0.7 | 32.47 | 7.846 | 3.73 |
| 2 | −0.407 | 5.487 | 2.7 | 30.47 | 7.439 | 4.137 |
| 4 | −0.814 | 6.058 | 4.7 | 28.47 | 7.032 | 4.544 |
| 6 | −1.231 | 6.73 | 6.7 | 26.47 | 6.615 | 4.961 |
| 8 | −1.663 | 7.528 | 8.7 | 24.47 | 6.183 | 5.393 |
| 10 | −2.105 | 8.486 | 10.7 | 22.47 | 5.741 | 6.835 |
| 12 | −2.556 | 9.649 | 12.7 | 20.47 | 5.29 | 6.286 |
| 14 | −3.004 | 11.079 | 14.7 | 18.47 | 4.842 | 7.734 |
| 16 | −3.462 | 12.856 | 16.7 | 16.47 | 4.384 | 7.192 |
| 18 | −3.909 | 15.097 | 18.7 | 14.47 | 3.937 | 7.639 |
| 20 | −4.321 | 17.967 | 20.7 | 12.47 | 3.525 | 8.051 |
| 22.587 | −4.736 | 23 | 23.287 | 9.883 | 3.11 | 8.466 |
| 23.587 | −4.836 | 25.47 | 24.287 | 8.883 | 3.01 | 8.566 |
| 24.587 | −4.866 | 23.329 | 25.287 | 7.883 | 2.98 | 8.596 |
| 25.587 | −4.826 | 31.629 | 26.287 | 6.883 | 3.02 | 8.556 |
| 26.587 | −4.661 | 35.464 | 27.287 | 5.883 | 3.185 | 8.391 |
| 27.598 | −4.32 | 40 | 28.298 | 4.872 | 5.526 | 8.05 |
| 28.098 | −4.079 | 42.525 | 28.798 | 4.372 | 3.767 | 7.809 |
| 28.598 | −3.769 | 45.277 | 29.298 | 3.872 | 4.077 | 7.499 |
| 29.783 | −2.636 | 53.066 | 30.483 | 2.687 | 5.21 | 6.366 |
| 30.283 | −1.933 | 56.973 | 30.983 | 2.187 | 5.913 | 5.663 |
| 30.783 | −1.031 | 61.605 | 31.483 | 1.687 | 6.815 | 4.761 |
| 31.283 | 0.184 | 67.329 | 31.983 | 1.187 | 8.03 | 3.546 |
| 31.777 | 0.459 | 68.574 | 32.077 | 1.093 | 8.3 | 3.276 |
| 31.771 | 1.913 | 74.99 | 32.471 | 0.699 | 9.759 | 1.817 |

(A = 0.7 + δ, B = 32.47 − δ, C = 7.846 + t, 0D = 3.73 − t)

As shown in FIGS. 2, 4, 6, 8, and 10, the first and the third lens groups 10, 30 are fixed, and the second and the fourth lens groups 20, 40 are movable along the optical axis. The second lens group 20 may be moved linearly along the optical axis. Specifically, a focal length from the wide-angle end to the telephoto end is changed while zooming, and thus, the second lens group 20 moves to increase the distance between the first lens group 10 and the second lens group 20 and to decrease the distance between the second lens group 20 and the third lens group 30. In addition, the fourth lens group 40 may be movable in an auto focusing method.

Tables 3 and 4 provide numerical data of a zoom lens according to an embodiment of the present invention.

In Table 4, A, B, C, and D represent the distance between the fourth lens L4 and the fifth lens L5, the distance between the eighth lens L8 and the ninth lens L9, the distance between the eleventh lens L11 and the twelfth lens L12, and the distance between the thirteenth lens L13 and the optical filter 60, respectively.

TABLE 3

| Surface | Radius (r) | Thickness | Material | $N_d$ | $v_d$ | Optical Radius |
|---|---|---|---|---|---|---|
| 1 | 82.6866 | 1.4 | Fds9 | 1.846658 | 23.9 | 37 |
| 2 | 51.04025 | 5 | Fcd1 | 1.496997 | 81.6 | 36 |
| 3 | −1386.419 | 0.3 | | | | 35.6 |
| 4 | 60.66452 | 3.3 | Fcd1 | 1.496997 | 81.6 | 34.4 |
| 5 | 225.72152 | 0.3 | | | | 33.8 |
| 6 | 29.21217 | 4 | Fcd1 | 1.496997 | 81.6 | 31.4 |
| 7 | 74.13293 | A | | | | 30.8 |
| 8 | 57.62576 | 1 | Tafd30 | 1.882996 | 40.8 | 15.4 |
| 9 | 7.92549 | 4 | | | | 11.6 |
| 10 | −17.86529 | 0.9 | Tafd5 | 1.834996 | 43 | 11.6 |
| 11 | 32.65467 | 0.7 | | | | 11.6 |
| 12 | 22.26055 | 3 | Fds9 | 1.846658 | 23.9 | 11.8 |
| 13 | −24.77488 | 1 | Tafd5 | 1.834996 | 43 | 11.8 |
| 14 | −57.73435 | B | | | | 11.8 |
| 15 | Diaphragm | 0.7 | | | | 6.8-10.2 |
| 16 | 9.67514 | 2.5 | LacL3 | 1.664795 | 53.4 | 10.8 |
| 17 | 16.37449 | 2 | | | | 10.2 |
| 18* | 7.6924497 (aspheric) | 2.9 | M-pcd4 | 1.61881 | 63.85 | 9.6 |
| 19 | −82.74007 | 0.5 | | | | 9 |
| 20 | 71.59357 | 1 | L-nbh54 | 1.902 | 25.1 | 8.2 |

TABLE 3-continued

| Surface | Radius (r) | Thickness | Material | $N_d$ | $v_d$ | Optical Radius |
|---|---|---|---|---|---|---|
| 21* | 8.8146266 (aspheric) | C | | | | 7.4 |
| 22 | 11.89249 | 3.2 | Lac13 | 1.693501 | 53.3 | 8.4 |
| 23 | −21.11966 | 1 | F6 | 1.636352 | 35.3 | 8 |
| 24 | 33.93558 | D | | | | 7.8 |
| 25 | | 0.3 | Bsc7 | 1.516798 | 64.2 | 6.6 |
| 26 | | 0.3 | | | | 6.6 |
| 27 | | 0.5 | Bsc7 | 1.516798 | 64.2 | 6.4 |
| 28 | | 0.4 | | | | 6.4 |
| Image | | F | | | | |

TABLE 4

| Construction | Wide Angle End | First Middle Position | Second Middle Position | Third Middle Position | Telephoto End |
|---|---|---|---|---|---|
| A | 0.7 | 23.287 | 28.298 | 30.483 | 32.471 |
| B | 32.47 | 9.883 | 4.872 | 2.687 | 0.699 |
| C | 7.846 | 3.11 | 3.526 | 5.21 | 9.759 |
| D | 3.73 | 8.466 | 8.05 | 6.366 | 1.817 |
| BFL | 0.4 | 0.4 | 0.4 | 0.4 | 0.4 |
| F | −0.0166 | 0.0174 | −0.008 | −0.025 | −0.0175 |
| EFL | 5 | 23 | 40 | 53 | 75 |

Astigmatism aberration and distortion aberration, according to an operation state of a zoom lens, are described in detail with reference to FIGS. 3, 5, 7, 9, and 11. FIG. 3 is a graph showing astigmatism aberration and distortion aberration at the wide-angle end, according to an embodiment of the present invention. FIG. 5 is a graph showing astigmatism aberration and distortion aberration at the first middle position, according to an embodiment of the present invention. FIG. 7 is a graph showing astigmatism aberration and distortion aberration at the second middle position, according to an embodiment of the present invention. FIG. 9 is a graph showing astigmatism aberration and distortion aberration at the third middle position, according to an embodiment of the present invention. FIG. 11 is a graph showing astigmatism aberration and distortion aberration at the telephoto end, according to an embodiment of the present invention.

The reference wavelength is 546.07 nm, and both astigmatism aberration and distortion aberration are within a reasonable range as shown in FIGS. 3, 5, 7, 9, and 11.

The embodiment of the present invention may be applicable to the design of a zoom lens that is used for a film making equipment which provides high quality photographing without employing devices for mechanical or electrical stabilization.

As described above, according to the embodiment of the present invention, the number of lenses and the number of aspheric lenses are reduced, thereby decreasing the overall length of an optical system of a zoom lens, improving a Modulation Transfer Function (MTF) value, and enhancing hand shake correction.

While the invention has been shown and described with references to certain embodiments thereof, it will be understood by those skilled in the art that various changes in form and detail may be made therein without departing from the spirit and scope of the invention as defined by the appended claims.

What is claimed is:

1. An optical system of a zoom lens comprising thirteen lenses that are divided into four lens groups, wherein:
in an order from a subject, the zoom lens comprises:
a first lens group having a positive refractive power;
a second lens group having a negative refractive power, and capable of moving along an optical axis;
a third lens group having a positive refractive power; and
a fourth lens group having a positive refractive power;
wherein the first lens group comprises four lenses, and an external surface of a first lens is concave in a direction of a plane of an image; wherein the third lens group comprises two meniscus lenses that are concave toward an image plane, and is capable of cross-section displacement relative to an optical axis; and wherein the fourth lens group is a convex-concave glued lens.

2. The optical system of the zoom lens as claimed in claim 1, wherein a magnification of the third lens group ranges from approximately −0.58 to approximately −0.45.

3. The optical system of the zoom lens as claimed in claim 1, wherein the optical system of the zoom lens further comprises an aperture that is fixed with respect to the image plane.

4. The optical system of the zoom lens as claimed in claim 1, wherein parameters of lenses and materials comprised in the lenses correspond to:

| Surface | Radius (r) | Thickness | $N_d$ | $v_d$ |
|---|---|---|---|---|
| 1 | 82.6866 | 1.4 | 1.846658 | 23.9 |
| 2 | 51.04025 | 5 | 1.496997 | 81.6 |
| 2 | −1386.419 | 0.3 | | |
| 4 | 60.66452 | 3.3 | 1.496997 | 81.6 |
| 5 | 225.72152 | 0.3 | | |
| 6 | 29.21217 | 4 | 1.496997 | 81.6 |
| 7 | 74.13293 | A | | |
| 8 | 57.62576 | 1 | 1.882996 | 40.8 |
| 9 | 7.92549 | 4 | | |
| 10 | −17.86529 | 0.9 | 1.834996 | 43 |
| 11 | 32.65467 | 0.7 | | |
| 12 | 22.26055 | 3 | 1.846658 | 23.9 |
| 13 | −24.77488 | 1 | 1.834996 | 43 |
| 14 | −57.73435 | B | | |
| 15 | Diaphragm | 0.7 | | |
| 16 | 9.67514 | 2.5 | 1.664795 | 53.4 |
| 17 | 16.37449 | 2 | | |
| 18* | 7.6924497 (aspheric) | 2.9 | 1.61881 | 63.85 |
| 19 | −82.74007 | 0.5 | | |
| 20 | 71.59357 | 1 | 1.902 | 25.1 |
| 21* | 8.8146266 (aspheric) | C | | |
| 22 | 11.89249 | 3.2 | 1.693501 | 53.3 |
| 23 | −21.11966 | 1 | 1.636352 | 35.3 |
| 24 | 33.93558 | D | | |
| 25 | | 0.3 | 1.516798 | 64.2 |
| 26 | | 0.3 | | |

-continued

| Surface | Radius (r) | Thickness | $N_d$ | $v_d$ |
|---|---|---|---|---|
| 27 | | 0.5 | 1.516798 | 64.2 |
| 28 | | 0.4 | | |
| Image | | F | | |

($N_d$: Refractive Power $v_d$: Abbe Number)

Reference Wavelength: 546.07 nm

| | Wide Angle End | First middle Position | Second middle Position | Third middle Position | Telephoto End |
|---|---|---|---|---|---|
| A | 0.7 | 23.287 | 28.298 | 30.483 | 32.471 |
| B | 32.47 | 9.883 | 4.872 | 2.687 | 0.699 |
| C | 7.846 | 3.11 | 3.526 | 5.21 | 9.759 |
| D | 3.73 | 8.466 | 8.05 | 6.366 | 1.817 |
| BFL | 0.4 | 0.4 | 0.4 | 0.4 | 0.4 |
| F | −0.0166 | 0.0174 | −0.008 | −0.025 | −0.0175 |
| EFL | 5 | 23 | 40 | 53 | 75 |

Aspheric Constant

| | r18 | r21 |
|---|---|---|
| Curvature | 0.1299976 = 1/r | 0.1134478 = 1/r |
| k | 0.5611781 | 4.042887e−5 |
| a | 0 | 0 |
| b | 9.1680091e−5 | 5.3525709e−4 |
| c | 3.6300519e−7 | 7.7200082e−6 |
| d | 1.8933452e−8 | 6.0747594e−8 |
| e | 2.2026398e−9 | 1.1527088e−8 |
| f | | 1.1796855e−9 |

5. An optical system of a zoom lens comprising:
a first lens group having a positive refractive power;
a second lens group disposed behind the first lens group, and having a negative refractive power;
a third lens group disposed behind the second lens group, and having a positive refractive index; and
a fourth lens group disposed behind the third lens group, and having a positive refractive power,
wherein the third lens group comprises two meniscus lenses two aspheric lenses, and one convex lens disposed between the two meniscus lenses,
wherein the fourth lens group is a convex-concave glued lens, and wherein the second lens group is capable of moving linearly with respect to an optical axis.

6. The optical system of the zoom lens as claimed in claim 5, wherein the second lens group moves when a focal length varies from a wide angle end to a telephoto end so that a distance between the first and the second lens groups is increased and a distance between the second and the third lens groups is decreased.

7. The optical system of the zoom lens as claimed in claim 5, wherein the second lens group comprises a lens made of a high refractive power material.

8. The optical system of the zoom lens as claimed in claim 5, wherein the fourth lens group comprises a doublet lens.

9. The optical system of the zoom lens as claimed in claim 5, wherein a magnification of the third lens group ranges from approximately −0.58 to approximately −0.45.

10. The optical system of the zoom lens as claimed in claim 5, further comprising a fixed aperture.

11. The optical system of the zoom lens as claimed in claim 5, wherein parameters of lenses and materials comprised in the lenses correspond to:

| Surface | Radius (r) | Thickness | $N_d$ | $v_d$ |
|---|---|---|---|---|
| 1 | 82.6866 | 1.4 | 1.846658 | 23.9 |
| 2 | 51.04025 | 5 | 1.496997 | 81.6 |
| 2 | −1386.419 | 0.3 | | |
| 4 | 60.66452 | 3.3 | 1.496997 | 81.6 |
| 5 | 225.72152 | 0.3 | | |
| 6 | 29.21217 | 4 | 1.496997 | 81.6 |
| 7 | 74.13293 | A | | |
| 8 | 57.62576 | 1 | 1.882996 | 40.8 |
| 9 | 7.92549 | 4 | | |
| 10 | −17.86529 | 0.9 | 1.834996 | 43 |
| 11 | 32.65467 | 0.7 | | |
| 12 | 22.26055 | 3 | 1.846658 | 23.9 |
| 13 | −24.77488 | 1 | 1.834996 | 43 |
| 14 | −57.73435 | B | | |
| 15 | Diaphragm | 0.7 | | |
| 16 | 9.67514 | 2.5 | 1.664795 | 53.4 |
| 17 | 16.37449 | 2 | | |
| 18* | 7.6924497 (aspheric) | 2.9 | 1.61881 | 63.85 |
| 19 | −82.74007 | 0.5 | | |
| 20 | 71.59357 | 1 | 1.902 | 25.1 |
| 21* | 8.8146266 (aspheric) | C | | |
| 22 | 11.89249 | 3.2 | 1.693501 | 53.3 |
| 23 | −21.11966 | 1 | 1.636352 | 35.3 |
| 24 | 33.93558 | D | | |
| 25 | | 0.3 | 1.516798 | 64.2 |
| 26 | | 0.3 | | |
| 27 | | 0.5 | 1.516798 | 64.2 |
| 28 | | 0.4 | | |
| Image | | F | | |

($N_d$: Refractive Power $v_d$: Abbe Number)

Reference Wavelength: 546.07 nm
Aspheric Constant

| | Wide Angle End | First middle Position | Second middle Position | Third middle Position | Telephoto End |
|---|---|---|---|---|---|
| A | 0.7 | 23.287 | 28.298 | 30.483 | 32.471 |
| B | 32.47 | 9.883 | 4.872 | 2.687 | 0.699 |
| C | 7.846 | 3.11 | 3.526 | 5.21 | 9.759 |
| D | 3.73 | 8.466 | 8.05 | 6.366 | 1.817 |
| BFL | 0.4 | 0.4 | 0.4 | 0.4 | 0.4 |
| F | −0.0166 | 0.0174 | −0.008 | −0.025 | −0.0175 |
| EFL | 5 | 23 | 40 | 53 | 75 |

| | r18 | r21 |
|---|---|---|
| Curvature | 0.1299976 = 1/r | 0.1134478 = 1/r |
| k | 0.5611781 | 4.042887e−5 |
| a | 0 | 0 |
| b | 9.1680091e−5 | 5.3525709e−4 |
| c | 3.6300519e−7 | 7.7200082e−6 |
| d | 1.8933452e−8 | 6.0747594e−8 |
| e | 2.2026398e−9 | 1.1527088e−8 |
| F | | 1.1796855e−9 |

12. A photographing apparatus, comprising:
an optical system of a zoom lens having thirteen lenses that are divided into four lens groups, wherein, in an order from a subject, the zoom lens comprises:
a first lens group having a positive refractive power;
a second lens group having a negative refractive power, and capable of moving along an optical axis;
a third lens group having a positive refractive power; and
a fourth lens group having a positive refractive power;
wherein the first lens group comprises four lenses, and an external surface of a first lens is concave in a direction of a plane of an image; wherein the third lens group comprises two meniscus lenses that are concave toward an image plane, and is capable of cross-section displacement relative to an optical axis; and wherein the fourth lens group is a convex-concave glued lens.

* * * * *